(12) United States Patent
Dearden et al.

(10) Patent No.: US 10,281,039 B2
(45) Date of Patent: May 7, 2019

(54) LEVER

(71) Applicant: JAGUAR LAND ROVER LIMITED, Warwickshire (GB)

(72) Inventors: Tom Dearden, Whitley (GB); Steven Dunseith, Whitley (GB); Phillip Cashmore, Whitley (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 312 days.

(21) Appl. No.: 15/303,014

(22) PCT Filed: Apr. 1, 2015

(86) PCT No.: PCT/EP2015/057241
§ 371 (c)(1),
(2) Date: Oct. 10, 2016

(87) PCT Pub. No.: WO2015/155100
PCT Pub. Date: Oct. 15, 2015

(65) Prior Publication Data
US 2017/0030465 A1    Feb. 2, 2017

(30) Foreign Application Priority Data
Apr. 11, 2014    (GB) .................................. 1406547.8

(51) Int. Cl.
*F16H 63/34* (2006.01)
*F16C 1/14* (2006.01)

(52) U.S. Cl.
CPC ......... *F16H 63/3491* (2013.01); *F16C 1/145* (2013.01)

(58) Field of Classification Search
CPC .............................. F16H 63/3491; F16C 1/145
See application file for complete search history.

(56) References Cited

U.S. PATENT DOCUMENTS

| 6,202,504 | B1 | 3/2001 | Burkle |
| 2009/0151501 | A1* | 6/2009 | Jung ......................... F16C 1/12 74/502 |

(Continued)

FOREIGN PATENT DOCUMENTS

| DE | 4317257 C1 | 5/1994 |
| DE | 19653961 A1 | 6/1998 |

(Continued)

OTHER PUBLICATIONS

International Search Report and Written Opinion of the International Searching Authority for International application No. PCT/EP2015/057241 dated Aug. 31, 2015.

(Continued)

*Primary Examiner* — Vicky A Johnson
(74) *Attorney, Agent, or Firm* — Carlson, Gaskey & Olds

(57) ABSTRACT

A lever, or a lever assembly comprising a lever, for actuating a release mechanism of a vehicle, the lever being arranged for translating input force applied to an input of the lever into output force exerted at an output of the lever. The input comprises an input formation for engaging a lever extension for enhancing a mechanical advantage of the lever, and the output comprises an output formation co-operable with a release element of a release mechanism.

20 Claims, 6 Drawing Sheets

(56) References Cited

U.S. PATENT DOCUMENTS

| | | | | |
|---|---|---|---|---|
| 2010/0018813 | A1* | 1/2010 | Narayanan V. | B60T 11/04 |
| | | | | 188/166 |
| 2011/0005890 | A1* | 1/2011 | Volz | B60T 17/18 |
| | | | | 192/218 |
| 2011/0030494 | A1 | 2/2011 | Ruhl | |
| 2012/0272780 | A1* | 11/2012 | Schimings | F16C 1/262 |
| | | | | 74/502.4 |
| 2012/0298473 | A1* | 11/2012 | Merklein | F16H 63/3491 |
| | | | | 192/219.6 |
| 2013/0020171 | A1 | 1/2013 | Jang et al. | |
| 2014/0151180 | A1* | 6/2014 | Weifels | F16H 63/3433 |
| | | | | 192/219.5 |
| 2014/0311269 | A1* | 10/2014 | Fournier | F16H 59/0278 |
| | | | | 74/473.3 |

FOREIGN PATENT DOCUMENTS

| | | | | |
|---|---|---|---|---|
| DE | 102008000857 A1 | | 10/2009 | |
| GB | 2501600 A | | 10/2013 | |
| JP | 2007224998 A | * | 9/2007 | F16C 1/145 |
| WO | 2013/079182 A1 | | 6/2013 | |

OTHER PUBLICATIONS

Combined Search and Examination Report under Sections 17 and 18(3) for Application No. GB1406547.8 dated Nov. 11, 2014.

* cited by examiner

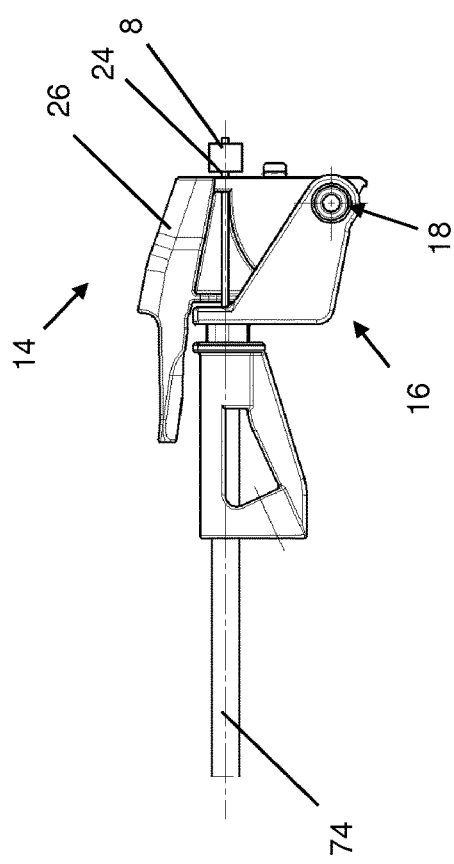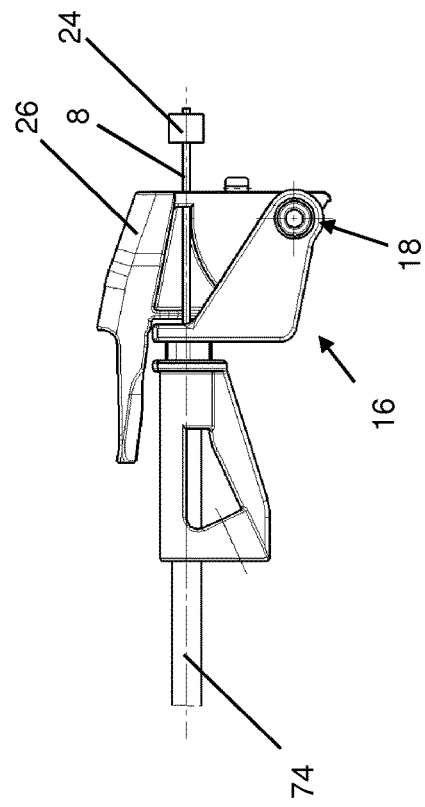

LEVER

TECHNICAL FIELD

This invention relates to a lever. In particular, though not exclusively, this invention relates to a lever for actuating a release mechanism of a vehicle, such as, for example, a park lock release mechanism.

BACKGROUND

An automatic transmission of the type commonly used in automotive vehicles is controlled by a gear shift lever, located in a driving compartment of the vehicle and movable by a vehicle operator between positions corresponding to transmission gear ranges or modes such as "Park", "Reverse", "Neutral", "Drive", and "Low".

In "Park" mode, a transmission output shaft of the vehicle is disengaged from a vehicle engine. Furthermore, a park lock mechanism, typically a pawl, is moved into locking engagement with a gear on the output shaft to thereby lock the output shaft against rotation.

In modern vehicles, park lock mechanisms are generally electro-hydraulically actuated. In the event of loss of both engine and electrical power, the automatic transmission will generally default to "Park". In such situations, without any power to crank the engine, the park lock mechanism cannot be disengaged by electronic actuation. Such release may however be required, for example to tow the vehicle, before the engine can be restarted.

It is known to provide an (emergency) park lock release mechanism in vehicles for mechanically disengaging the park lock mechanism when required. Such a release mechanism typically comprises a Bowden cable connected to the park lock mechanism and a park release lever movable by a user to exert a tensile force on the Bowden cable sufficient to release the park lock mechanism.

In many vehicles the park release lever is mounted in a driving compartment, e.g. within a centre console. However, such mounting may not always be desirable, particularly since it complicates routing of the associated cable. In particular, at least two cable pieces are often required for such mounting due to routing challenges during manufacture.

To help generate the force required to release park lock mechanisms, park release levers have hitherto been of a substantial size. The substantial size of park release levers has restricted possibilities for alternative mounting, for example under the bonnet of a vehicle.

One prior art approach for eliminating the park release lever from the driving compartment without taking up excessive space under the bonnet is to offer a combination of a park release lever and an upper cable as a service tool, for connection with a lower cable found under the bonnet. While this arrangement saves space in the driving compartment and under the bonnet, it necessitates the carrying of a dedicated service tool.

It is an object of the invention to provide a lever for actuating a release mechanism of a vehicle, which lever does not require excessive space and offers convenient operation.

SUMMARY OF THE INVENTION

Some aspects of the invention provide an extendible lever or lever assembly for actuating a release mechanism of a vehicle.

According to an aspect of the invention there is provided a lever, or a lever assembly comprising a lever, for actuating a release mechanism of a vehicle, the lever being arranged for translating input force applied to an input of the lever into output force exerted at an output of the lever, wherein the input comprises an input formation for engaging a lever extension for enhancing a mechanical advantage of the lever, and the output comprises an output formation cooperable with a release element of a release mechanism.

The lever advantageously enables its mechanical advantage to be enhanced by engagement of an extension. This in turn enables a small size of the lever whilst still enabling sufficient force to be applied to a release mechanism. Accordingly, the lever is easily and widely mountable and does not require excessive space.

Advantageously, the input formation may be arranged for locating and engaging an extension to form an extended input, such that input force can be applied to the extension and translated into output force exerted at the output of the lever.

In an embodiment, the input formation is arranged to engage an extension in a sliding clearance fit. Such engagement is particularly convenient for users.

In an embodiment, the input formation comprises a slot. The slot may be arranged for engaging a shaft of a screwdriver constituting the extension. This offers particularly convenient operation of the lever. Advantageously, the slot may be arranged for engaging a shaft of a flat-tipped screwdriver constituting the extension. In an embodiment, the slot comprises a generally oblong cross-section. The oblong cross-section may suitably comprise rounded corners, to reduce material stress.

To aid location of the lever input extension, and particularly to help engage the extension in a sliding clearance fit, the slot may advantageously be tapered.

In an embodiment, the slot comprises first and second openings, i.e. defines a passage. Such an arrangement may particularly facilitate a sliding clearance fit and/or avoid the accumulation of dirt in the slot.

For extra durability, the input formation may advantageously comprise one or more reinforced walls.

In an embodiment the input comprises a finger grip. Advantageously, the finger grip may be arranged for facilitating movement of the lever, for example initial movement from a first or second position as described anywhere hereinbelow.

In an embodiment, the output formation comprises a fixing for securing a release element. Advantageously, the fixing may be a unidirectional fixing. Such a unidirectional fixing may advantageously be configured such that a travel of the release element is delimited by the fixing in a first direction but not in a second direction. A unidirectional fixing may advantageously allow the lever or lever assembly to remain in a stationary position while a unidirectionally secured release element is actuated, e.g. by an electromechanical actuator.

The mechanical advantage of the lever may be chosen consistent with desired application. Advantageously, the lever may be arranged to amplify the force translated from the input to the output such that a mechanical advantage of the (un-extended) lever is greater than 1:1. For particular economy of space, the mechanical advantage of the (un-extended) lever may advantageously be the range of from 1:1 to 3:1, in particular 2:1 to 3:1.

In an embodiment, the lever is a second order lever in which the output is located between a fulcrum and the input.

In an embodiment, the lever comprises a pivotable member, the pivotable member comprising the input and optionally the output. Advantageously, the pivotable member may comprise both the input and the output.

In an embodiment, the input formation is on a first side of the pivotable member and the pivotable member defines a release element path on an opposed, second side of the pivotable member. Suitably, the release element path may be defined by a guide of the pivotable member. To reduce strain on the release element, the guide may advantageously comprise a curved guide surface for defining the release element path.

As aforesaid, the input may comprise a finger grip. Advantageously, the pivotable member may comprise a finger grip of the input. In an embodiment, the input formation is on a first side of the pivotable member and the pivotable member comprises a finger grip on an opposed, second side of the pivotable member. Conveniently, the second side of the pivotable member may comprise a resting surface for resting the pivotable member, e.g. on a base as described anywhere hereinbelow, and the finger grip may be configured to aid lifting of the pivotable member when resting on the resting surface.

For particular economy of space, the pivotable member may comprise a first portion comprising the input formation and a second portion comprising the output formation, the first and second portions meeting at a kink or shoulder of the pivotable member. The first and second portions may advantageously be integral. In an embodiment, the pivotable member comprises an outer side bearing the input formation and an opposed, inner side, the first and second portions meeting such that the pivotable member is kinked towards the inner side.

The lever may be co-operable with a base in a lever assembly. The pivotable member may be pivotable relative to the base between a first and a second position. In an embodiment, movement from the first position towards the second position may be to actuate the release element, e.g. to actuate a release mechanism. Conveniently, the base may pivotably support the pivotable member at a fulcrum. Suitably, the fulcrum may comprise a rivet pivotably connecting the pivotable member and the base.

For compactness, the base may define a recess for accommodating pivoting movement of the pivotable member. The recess may, for example, accommodate the pivotable member in one or more of said positions of the lever. In an embodiment, the pivotable member comprises a guide and the base defines a recess for accommodating pivoting movement of the guide.

The pivotable member may be pivotably supported in any suitable manner. When the pivotable member comprises a first portion comprising the input formation and a second portion comprising the output formation, the first and second portions meeting at a kink of the pivotable member, the base may advantageously support the second portion of the pivotable member.

For good accessibility and economy of space, the input formation may be arranged to engage the extension in an engagement plane, the engagement plane being at an angle in the range of from 60 to 120 degrees, advantageously 90 to 115 degrees, to an end panel of the second portion of the pivotable member. In an embodiment, the pivotable member is movable through an arc in the range of from 45 to 135 degrees, e.g. an arc in the range of from 80 to 100 degrees.

The base may define a path for the release element. In an embodiment, the base and the pivotable member together define a combined release element path, and the pivotable member is movable with respect to the base between a first position in which the combined path is relatively short and a second position in which the combined path is relatively long. In this manner, the lever assembly can provide for tensile actuation of a release element affixed to the output formation by movement of the lever from the first position into the second position. In an embodiment, to reduce strain on the release element, the combined path may be arcuate, or comprise an arcuate section, in the second position. Conveniently, the combined path may be substantially linear in the first position.

Advantageously, the base may comprise a locating formation for locating a release element in the release element path. In an embodiment, the locating formation defines an aperture for locating a release element therein. In an embodiment, the pivotable member is movable with respect to the base between a first position in which the output formation is relatively close to the locating formation and a second position in which the output formation is relatively distant from the locating formation. This ensures tensile actuation of a release element affixed to the output formation by movement of the lever from the first position into the second position.

To avoid rattling and/or undesired movement, the base may comprise a clip for engaging the pivotable member in the first position and/or the second position. In an embodiment, the clip comprises a latch for locking the pivotable member in the first position and/or second position. In an embodiment, the clip comprises a ramped surface for resisting movement out of the first position and/or second position. Advantageously, the clip may be manually releasable.

In an embodiment, the pivotable member is arranged to abut the base in the first position to delimit further movement in a direction away from the second position. Suitably, the pivotable member may comprise a resting surface for abutting the base in the first position.

In an embodiment, the pivotable member is arranged to abut the base in the second position to delimit further movement in a direction away from the first position. Suitably, the pivotable member may comprise a stop formation for abutting the base in the second position.

To facilitate mounting of the lever assembly, the base may advantageously comprise a formation for engaging a mounting bracket. In an embodiment, the base comprises a snap-fit neck for engaging a snap-fit hook of a mounting bracket. The snap-fit neck may act as a support for the release element.

As aforesaid, the lever or lever assembly may advantageously be of a small size whilst still delivering sufficient force to actuate the release element. In an embodiment, the (un-extended) lever has a maximum pivoting radius of less than 15 cm, optionally less than 10 cm.

The lever assembly may optionally comprise the extension. In particular, the invention embraces a kit comprising a lever assembly and an extension.

The release element may conveniently comprise a cable connected to a release mechanism. In an embodiment, the release element comprises a Bowden cable. In an embodiment, the release element comprises a single length of cable connecting the output to a rigid link of the release mechanism. In an embodiment, the base comprises a support formation for supporting an outer sheath of the cable. In an embodiment, the output formation comprises an aperture for engaging a nipple affixed to the cable.

The release mechanism may be of any desired type. In an embodiment, the release mechanism comprises a pawl releasable from an engaged state by actuation, e.g. tensile actuation, of the release element. In an embodiment, the release mechanism is a park release mechanism of a vehicle. In an embodiment, the park release mechanism comprises a park pawl releasable from an engaged state by tensile actuation of the release element.

In an aspect of the invention, there is provided a system comprising: a release mechanism; and a lever, or lever assembly, as defined anywhere herein co-operable with the release mechanism to actuate the release mechanism. In particular, a release element of the release mechanism may be coupled with the output of the lever such that movement of the lever, e.g. between the first and second positions, causes actuation of the release mechanism.

In an aspect of the invention, there is provided a park lock system comprising: a park lock release mechanism; and a lever, or lever assembly, as defined anywhere herein co-operable with the park lock release mechanism to actuate the park lock release mechanism, in particular to release a park lock mechanism. In particular, a release element of the park lock release mechanism may be coupled with the output of the lever such that movement of the lever, e.g. between the first and second positions, causes actuation of the release mechanism.

In an aspect of the invention there is provided a vehicle comprising a lever or lever assembly, or a release system or a park lock system as defined anywhere herein. In an embodiment, the lever or lever assembly is mounted under an engine bonnet of the vehicle.

Due to the economy of space provided by the invention, under-bonnet mounting may be possible even where space is at a premium. Indeed, in an aspect of the invention, there is provided an extendible lever or lever assembly for actuating a release mechanism of a vehicle, the lever or lever assembly being mounted under an engine bonnet of a vehicle. The extendible lever or lever assembly may be, for example, comprise features as described anywhere herein.

The economy of space provided by the invention also offers advantages in mounting. In an aspect of the invention, there is provided a method of mounting in a vehicle, or to a vehicle component, a lever or lever assembly as described anywhere herein. In an embodiment, the method comprises passing the lever assembly through a gap with a maximum clearance of less than 10 cm, optionally less than 5 cm. In an embodiment, the method comprises connecting the lever or lever assembly to a release mechanism with a single length of actuating cable.

In an aspect of the invention there is provided a method of releasing a mechanism in a vehicle, the method comprising: providing a lever connected to a release element of the mechanism; extending the lever; and actuating the release element by applying a force to the extended lever.

In an embodiment, extending the lever comprises engaging an elongate or rod-like extension with an input of the lever to provide an extended input and actuating the extended input. In an embodiment, the elongate extension is a screwdriver.

Throughout the description and claims of this specification, the words "comprise" and "contain" and variations of the words, for example "comprising" and "comprises", mean "including but not limited to", and do not exclude other components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIGS. 6A and 6B are right side views of the mounted lever assembly of FIG. 1 in a closed position, with a release cable of the release mechanism in first and second travel states respectively.

DETAILED DESCRIPTION

Figure 1:
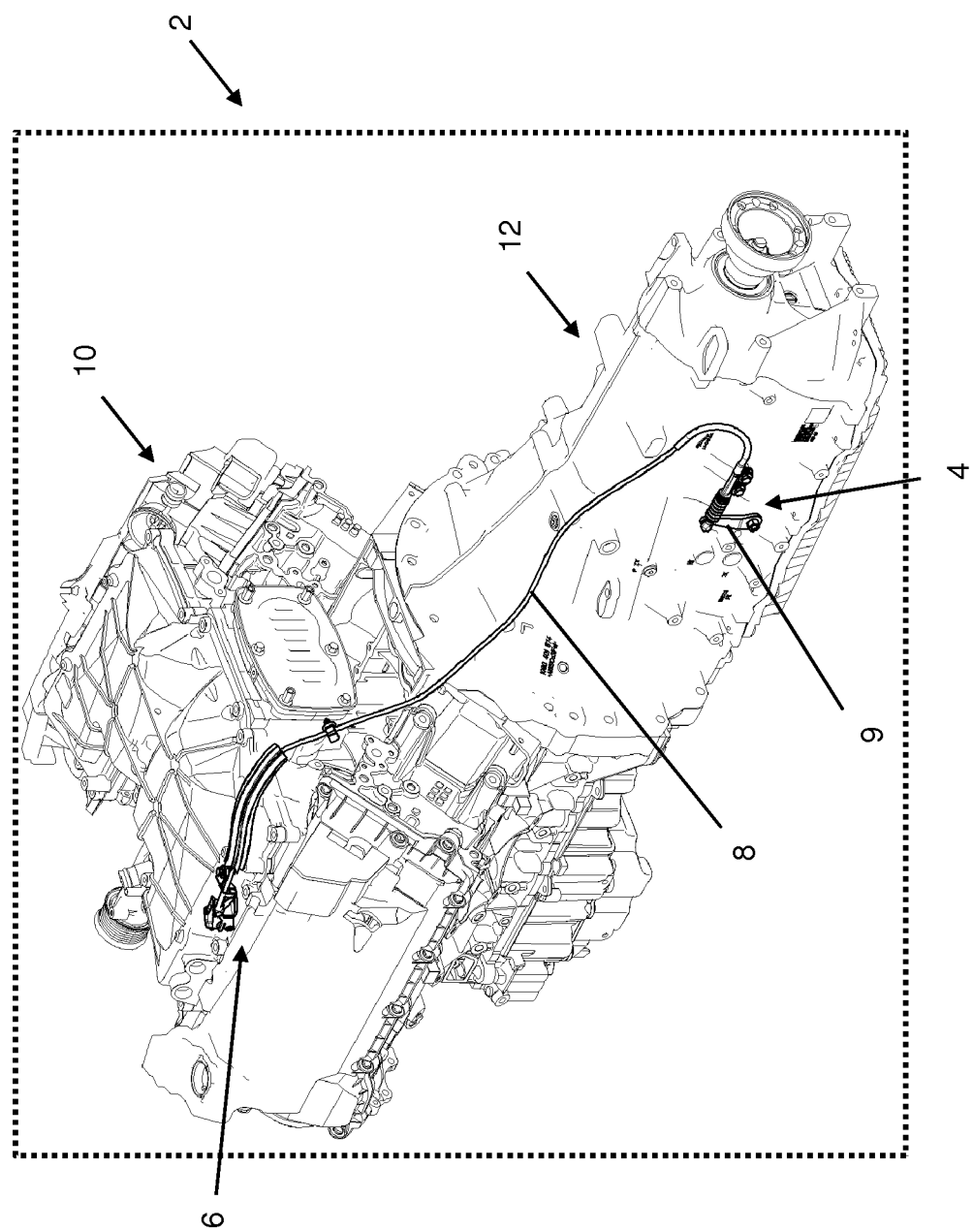
FIG. 1 is a partially schematic perspective view of a vehicle comprising a park lock release mechanism actuated by a lever assembly in accordance with one embodiment of the invention.

Referring firstly to FIG. 1, in one embodiment of the invention there is provided an automotive vehicle 2 comprising an emergency park lock release mechanism 4 coupled to a lever assembly 6 for actuating the park release mechanism 4. The lever assembly 6 is connected, via a single piece of Bowden cable 8, with a pivotable link 9 of the park lock release mechanism 4.

The vehicle 2 comprises an under-bonnet engine 10 and an automatic transmission and electronically actuated park lock mechanism 12. The park lock mechanism 12 comprises a park pawl (not shown) movable into locking engagement to lock rotation of the transmission. The park lock mechanism 12 is coupled with the link 9 of the release mechanism 4 such that actuation of the link 9 by the lever assembly 6, via the cable 8, causes the park lock mechanism 12, in particular the pawl, to be released.

Figure 2:
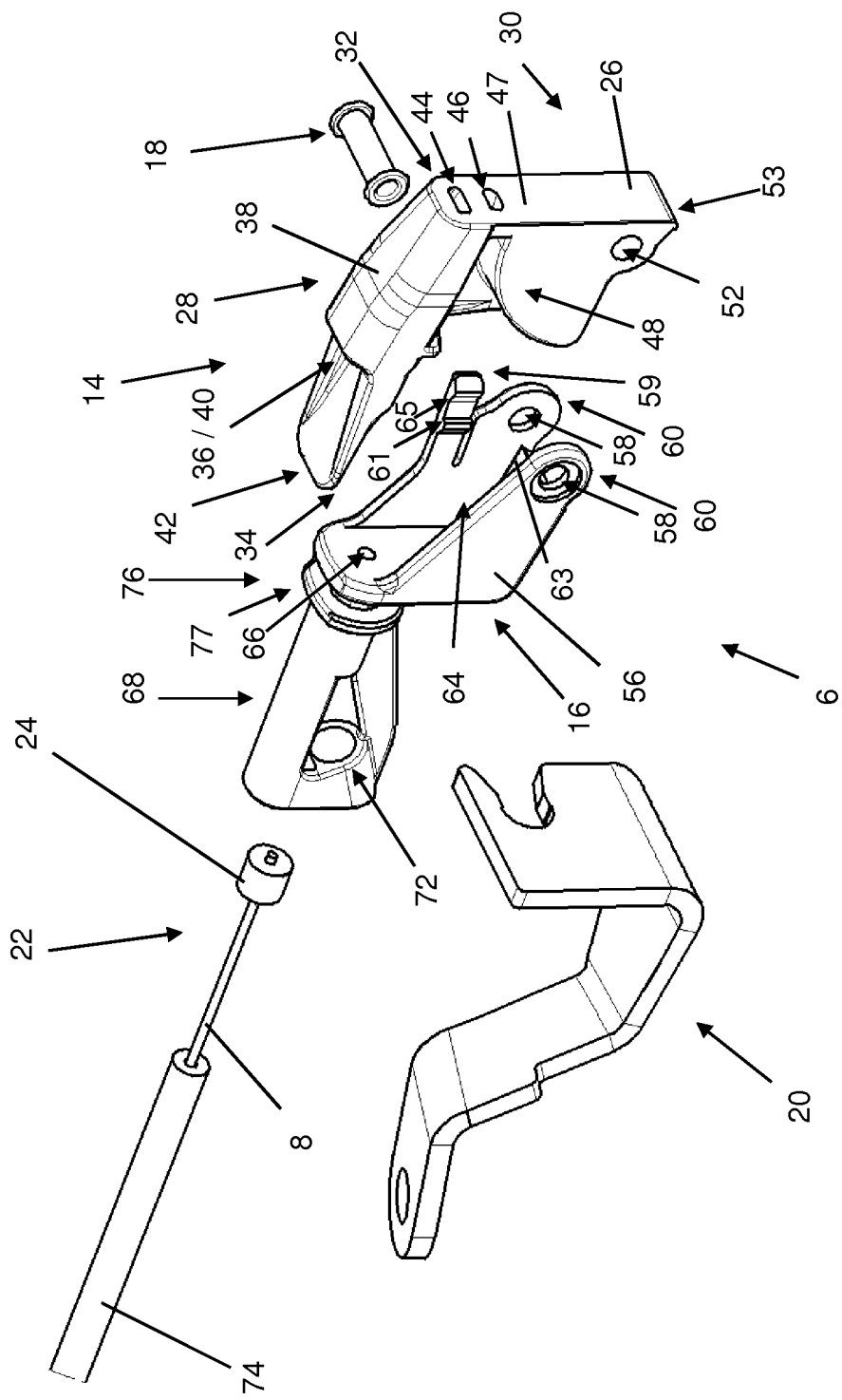
FIG. 2 is an exploded front right perspective view of the lever assembly and a release cable of the release mechanism shown in FIG. 1.
Figure 3:
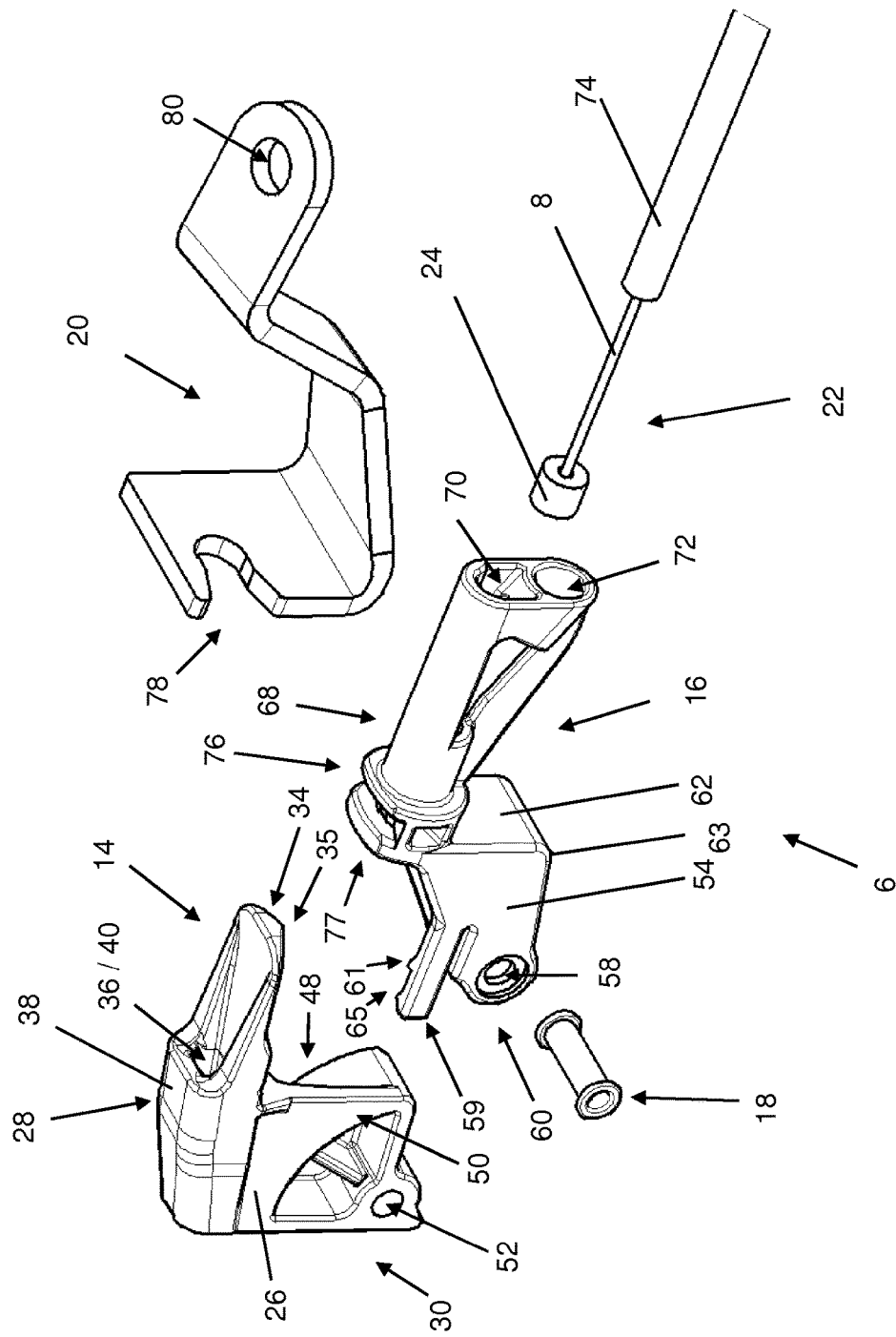
FIG. 3 is an exploded left rear perspective view of the lever assembly and a release cable of the release mechanism shown in FIG. 1.

Referring now to FIGS. 2 and 3, the lever assembly 6 comprises a lever 14 and a base in the form of an abutment 16. The lever 14 and the abutment 16 are formed from mouldable plastics material. The abutment 16 is arranged to support the lever 14 pivotably at a fulcrum in the form of a rivet 18. The lever assembly 6 also comprises a mounting bracket 20 for mounting the abutment 16 in the vehicle 2, in particular under the bonnet of the vehicle 2, on the engine 8. The mounting bracket 20 is formed of steel. The lever assembly 6 is coupled with an associated end 22 of the cable 8 comprising a metal nipple 24, as will be described.

The lever 14 comprises a pivotable member 26 made of mouldable plastics material. The pivotable member 26 comprises a first generally oblong portion 28 and a second generally oblong portion 30, which portions 28, 30 are integrally formed. Short sides of the first and second portions 28, 30 meet substantially orthogonally at a kink or shoulder 32 of the pivotable member 26.

The first portion 28 of the movable member 26 acts as an input of the lever 14, comprising a finger grip 34 and an input formation in the form of a reinforced slot 36. The finger grip 34 comprises first and second indentations on an underside 35 of the first portion 28 to aid finger access for movement of the movable member 26 out of a closed position, as will be described.

The reinforced slot 36 is formed integrally in the first portion 28 of the movable member by reinforced walls 38 and is shaped and sized for a sliding clearance fit with a standard flat-head screwdriver. In particular, the slot 36 is tapered, with a generally oblong cross section and is open at both ends. The slot 36 extends longitudinally with respect to the first portion 28 and is angled slightly to facilitate insertion of a screwdriver. A proximal opening 40 of the slot 36 at the end of a guide ramp 42 of the pivotable member 14 is arranged for receiving, locating and guiding the screwdriver, and a distal opening 44 of the slot 36 helps to avoid dirt build-up and aids with sliding clearance fit of a range of flat-headed screwdrivers or other similar tools.

The second portion 30 of the movable member 26 acts as an output of the lever 14, comprising an output formation in the form of a fixing aperture 46 for engaging the nipple 24 of the cable 8, and a cable guide 48 defining a path for the cable 8. The aperture 46 extends through an end panel 47 of the second portion 30 adjacent the shoulder 32 of the pivotable member 26, in a direction generally longitudinal with respect to the first portion 28. On an inner side of the second portion 30, the cable guide defines a path for the cable 8 away from the aperture 46. The cable guide 48 is an integrally formed curved section of the second portion 30, curving away from the aperture 46 and supported by supporting walls 50. The cable guide 48 is accessible from a right side of the lever 14 for connection of the cable 8, with access from the opposed, left side blocked by a supporting wall 50.

The second portion 30 of the movable member 26 also comprises a transverse pivot hole 52 for receiving the rivet 18 which connects the movable member 26 to the abutment 16 when the lever assembly 6 is assembled. On a diametrically opposed side of the pivot hole 52, the second portion 30 of the movable member 26 comprises a backstop projection 53 for abutting the abutment 16 in an open position of the lever 14, as will be described.

The abutment 16 comprises left and right side walls 54, 56 spaced to receive between them the second portion 30 of the movable member 26. The left and right walls 54, 56 of the abutment 16 each comprise an aligned pivot hole 58 at a wall apex 60, for connection, via the rivet 18 with the transverse pivot hole 52 of the movable member 26. The left wall 54 additionally comprises a flexible clip 59, including a latch 61 and a ramped surface 65, for engaging the movable member 26, as will be described. Opposed to the apexes 60 of the side walls 54, 56, the abutment 16 comprises a connecting wall 62 connecting the side walls 54, 56. Together with a lower wall 63 of the abutment 16 and the side walls 54, 56, the connecting wall 62 defines a recess 64 for accommodating the cable guide 48 of the movable member 26 in a closed position of the lever 14, as will be described.

The connecting wall 62 comprises a cable aperture 66 orthogonal to the pivot holes 58, for receiving the cable 8 from a cable fitting 68 of the abutment 16 and locating the cable 8. In the assembled lever assembly 6, the cable aperture 66 is aligned with the fixing aperture 46 of the second portion of the movable member 26 in a closed position of the lever 14, as will be described.

The cable fitting 68 of the abutment 16 is integrally formed with the connecting wall 62 and comprises alternative upper and lower cable supports 70, 72, each for supporting and holding in place an outer sheath 74 of the cable 8 such that the inner cable 8 is aligned with the cable aperture 66 of the connecting wall 62 of the abutment 16. To offer flexibility during mounting, the upper support 70 allows the cable 8 to be supported along an upper route while the lower support 72 allows the cable to be supported along an alternative lower route.

Externally, the cable fitting 68 comprises a snap fit neck 76 for engaging the mounting bracket 20. The neck 76 comprises an abutment surface 77 for supporting the movable member 26 in a closed position of the lever 14, as will be described. The mounting bracket 20 comprises a snap fit hook 78 for engaging the snap fit neck 76 of the cable fitting 68, whereby the abutment 16 can be secured to the mounting bracket 20, which is in turn mounted to a vehicle surface via a mounting bolt hole 80.

Figure 4:
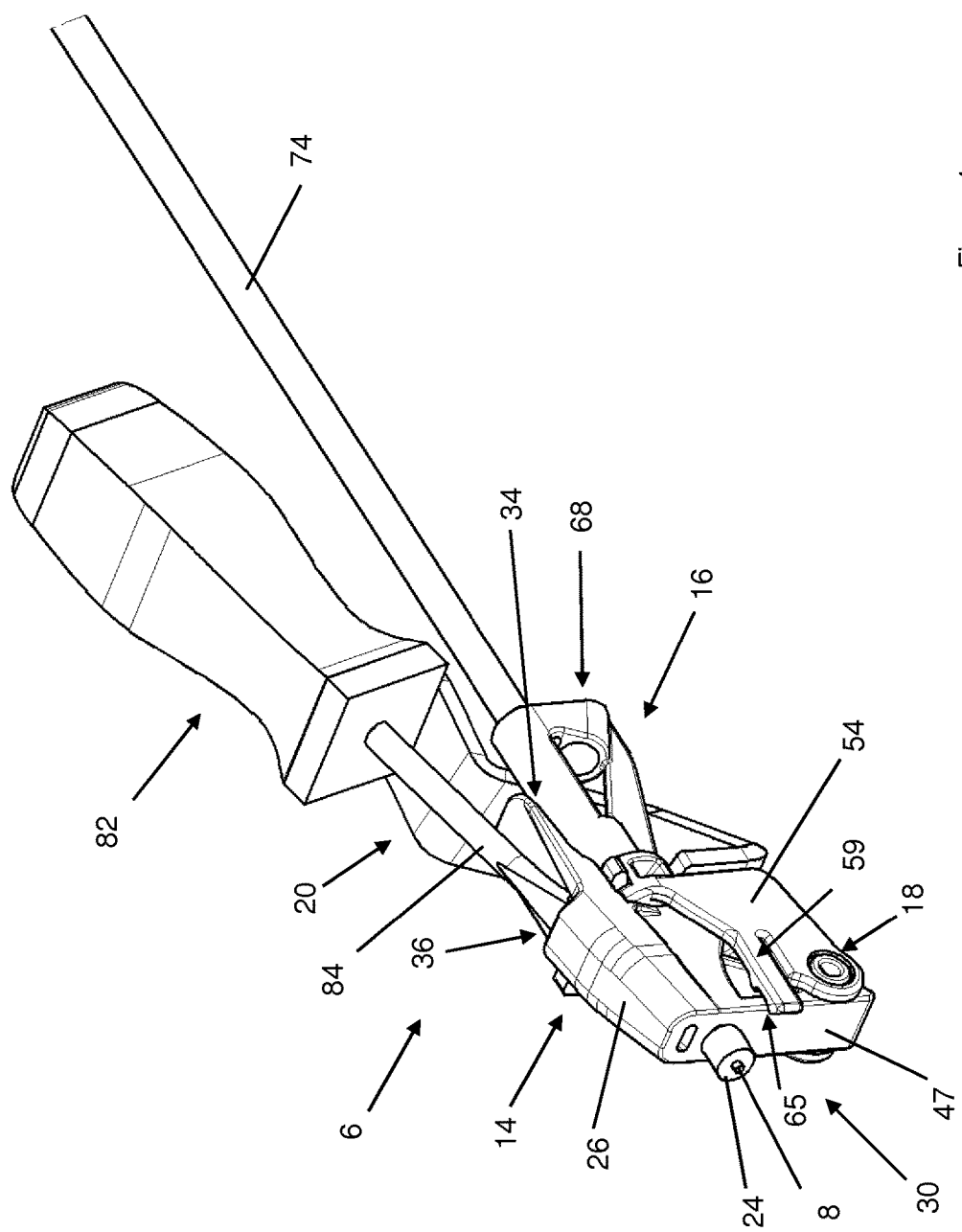
FIG. 4 is a left front perspective view of the mounted lever assembly of FIG. 1 in a closed position, with a screwdriver inserted into a slot of the lever assembly.
Figure 5:
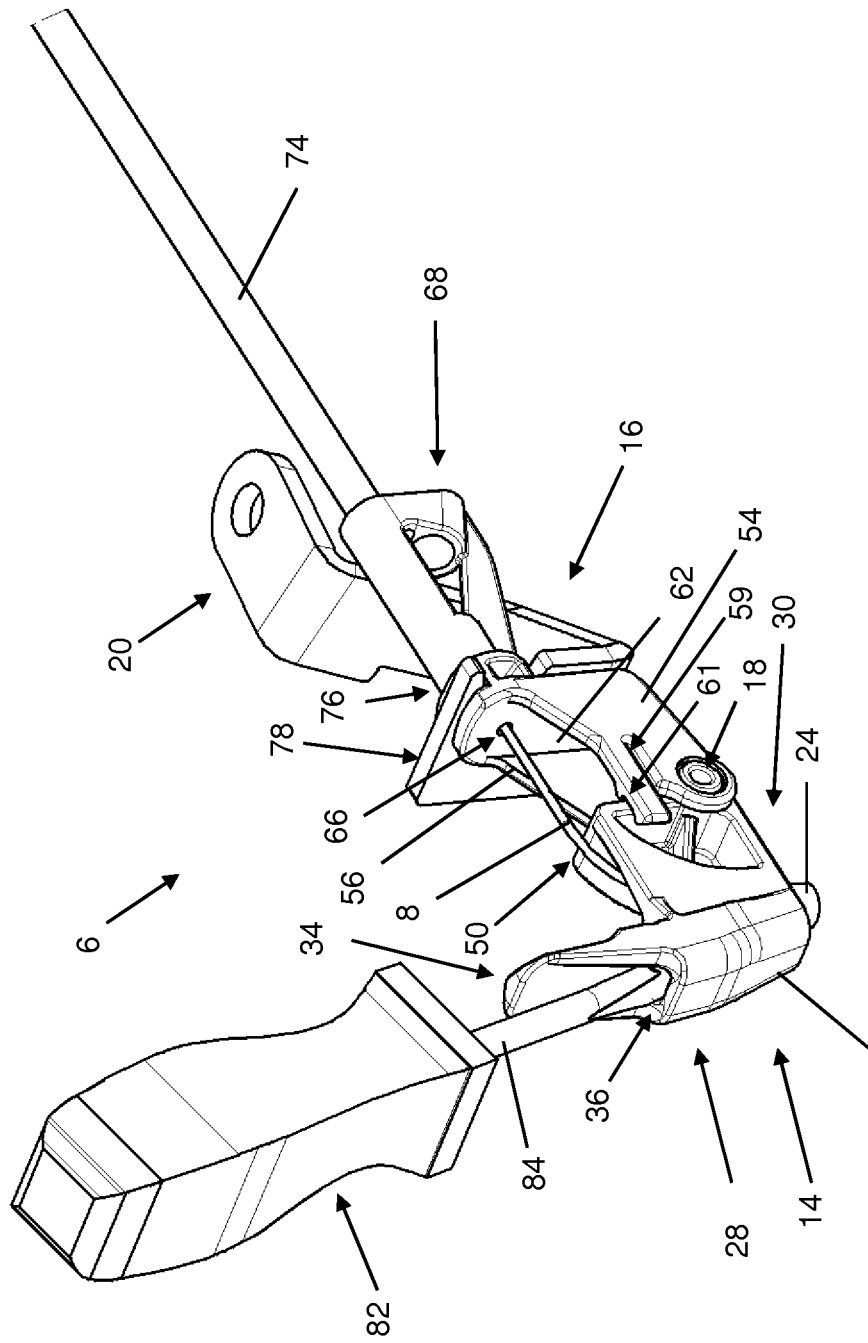
FIG. 5 is a left front perspective of the mounted lever assembly of FIG. 1 in an open position, with a screwdriver inserted into a slot of the lever assembly.

Referring now to FIGS. 4 and 5, in an assembled state of the lever assembly 6 the movable member 26 is pivotably connected to the abutment 16 by the rivet 18. The outer sheath 74 of the cable 8 is held in place by the cable fitting 68 of the abutment 16, with the cable 8 threaded through the cable aperture 66 of the connecting wall 62 of the abutment 16 and through the fixing aperture 46 (not visible in FIGS. 4 and 5) of the second portion 30 of the movable member 26. The threaded cable is then capped with the nipple 24 such that it cannot retreat through the fixing hole 46 and is therefore unidirectionally fixed. The abutment 16 is connected to the mounting bracket by engaging the snap fit neck and hook 76, 78 and the mounting bracket 20 is mounted to the vehicle 2 (not shown in FIGS. 4 and 5 for clarity).

Referring still to FIGS. 4 and 5, the lever 14, and indeed the lever assembly 6 as a whole, can be pivotably moved about the rivet 18 between a first, closed position and a second, open position. This may conveniently be achieved by inserting a flat-head screwdriver 82, in particular a flat-tipped shaft 84 thereof into the slot 36 of the movable member 26, whereby the screwdriver 82 is engaged and co-operable with the lever 14.

The screwdriver 82 acts as a lever extension, and in particular an extension to the first section 28 of the movable member 26, i.e. the input of the lever 14. The engaged screwdriver 82 acts to enhance the mechanical advantage of the lever 14 by increasing the distance of force input from the rivet 18 acting as fulcrum. The distance of the output of the lever 14, namely the fixing aperture 46, from the fulcrum remains constant. The mechanical advantage of the lever is increased from about 2.5:1 to about 8:1 by the screwdriver 82.

Referring now specifically to FIG. 4, in the closed position, the first portion 28 of the movable member 30, in particular the underside 35 thereof (not visible in FIG. 4), abuts the abutment surface 77 of the neck 76 of the abutment 16 (also not visible). In this closed position, the first portion 28 of the movable member 30 is generally horizontal in the orientation of FIG. 4 (though other orientations are possible when mounting), with the slot 36 extending upwards at a slight angle. The fixing aperture 46 of the second portion of the movable member 26 is relatively close to the cable aperture 66 of the abutment 16 and, as the fixing aperture 46 and cable aperture 66 are aligned, a relatively short linear cable path is defined between the apertures 46 and 66. The cable guide 48 of the movable member 26 is received in the recess 64 of the abutment (not visible in FIG. 4), and the clip 59 of the left wall 54 of the abutment 16, in particular the ramped surface 65 thereof, engages the end panel 47 of the second portion 30 of the movable member 26 to resist movement of the movable member 26 out of the closed position. This resistance helps to prevent rattling or unwanted movement of the movable member 26 in the closed position. The lever 14 and lever assembly 6 can be pivotably moved about the rivet 18 out of the closed position towards the open position by overcoming the resistance of the clip 59. Such movement is facilitated by the ramped surface 65 of the clip 59, with sliding movement of the end panel 47 along the ramped surface 65 gradually pushing the clip 59 into a disengaged position.

Referring now specifically to FIG. 5, in the open position, the movable member 26 is pivoted away from the neck 76 of the abutment 16, with the backstop projection 53 (not visible in FIG. 5) abutting the lower wall 63 (also not visible) of the abutment 16 to delimit further movement. In this open position, the first portion 28 of the movable member 30 is generally vertical in the orientation of FIG. 5. The fixing aperture 46 of the second portion of the movable member 26 is relatively far away from the cable aperture 66 of the abutment 16 and the cable bears against the cable guide 48 of the movable member 30 such that a relatively long, curved or arcuate cable path is defined between the apertures 46 and 66. The cable guide 48 of the movable member is substantially clear of the side walls 54, 56 of the abutment, and the clip 59 of the left wall 54 of the abutment 16, in particular the latch 61 thereof, engages a supporting wall 50 of the cable guide 48 to lock movement of the movable member 26 out of the open position until the clip 59 is released. Locking of the movable member 26 in the open position is useful to resist a return spring force imparted to the cable 8 by the park lock mechanism 12. The lever 14 and lever assembly 6 can be pivotably moved about the rivet 18 out of the open position towards the closed position by unlatching the movable member 26, i.e. releasing the latch 61. Once the clip 59 is unlatched, movement towards the closed position is assisted by return spring force from the cable 8.

Movement of the lever 14 from the first, closed position into the second, open position ensures that the cable 8 assumes a tensioned travel state. In particular, engagement between the movable member 26 and the nipple 24 of the cable ensures that, by virtue of the increasing distance between the cable aperture 66 and the fixing aperture 46, i.e. the increased cable path length within the lever assembly 6, the cable 8 is pulled into the tensioned travel state. Referring additionally to FIG. 1, the pivotable link 9 and emergency park lock release mechanism 4 are arranged such that, in the tensioned travel state of the cable 8, the park lock mechanism 12 is released. In this manner, the park lock mechanism 12 can be released by actuating the lever 6 to assume the second, open position.

As aforesaid, actuation or movement of the lever 6 is facilitated by the insertion of the screwdriver 82 into the slot 36, which provides a desirable mechanical advantage to help overcome tensile resistance in the cable 8. This desirable mechanical advantage is possible despite small dimensions of the lever assembly. In particular, the un-extended movable member 26 has a maximum pivoting radius of only about 9 cm.

The finger grip 34 of the first portion 28 of the movable member 26 facilitates initial movement of the lever 14 out of the closed position. In the closed position of FIG. 4, the indentations of the finger grip 34 enable a user to get a hold on the movable member 26 even whilst the underside 35 of the first portion 28, abuts the abutment surface 77 of the neck 76 of the abutment 16. Of course the finger grip 34 may also be useful in moving the lever 14 from the open position into the closed position, particularly as less force tends to be required for such movement due to spring assistance from the cable 8.

The unidirectional fixing of the cable 8 by the engagement of the nipple 24 and the fixing aperture 46 of the movable member 26 can further facilitate initial movement of the movable member 26. With reference to FIG. 6A, the park lock release mechanism 4 is arranged such that there is a small amount of play in the cable 8 in the closed position. Advantageously, this does not lead to rattling of the lever 14 since it is held in place by the clip 59. However, the play in the cable 8 ensures that the movable member 26 can be moved a small distance out of the closed position without encountering resistance from the cable 8. This enables initial movement of the lever 14 by a user's fingers, without need for the enhanced mechanical advantage imparted by the screwdriver 82. The initial movement in turn facilitates insertion of the screwdriver into the slot 36, since the direction for insertion is more accessibly clear once the initial movement has occurred.

Referring now to FIG. 6B, the unidirectional fixing and clip 59 have the further advantage that, during electromechanical release of the park lock mechanism 12, the cable can assume an extended travel state without movement of the movable member 26. In particular, the cable can simply advance further beyond the fixing aperture 46 if required, while the movable member 26 is held in place by the clip 59 to avoid rattling or unnecessary movement.

In an embodiment, the lever, assembly or system is mounted to a powertrain assembly of the vehicle. In particular, the whole assembly including the Bowden cable including its attachment to the park pawl release mechanism is mounted to the powertrain of a vehicle, such powertrain comprising at least an engine and transmission. Advantageously, in manufacture of the vehicle therefore, the entire lever assembly is fitted to the vehicle along with the powertrain as the powertrain is fitted to the vehicle body. This is an improvement over the prior art in which, in general, there is a connection operation of some form, either at one end of the cable or at some junction point along the length of the cable (the cable being separable effectively into two cable portions), which must also be performed as the powertrain is fitted to the body. This is nominally necessitated by a mounting to another part of the vehicle body, or within the cabin of the vehicle body, of part of a prior art assembly. In turn this is necessitated by the larger size of prior art assemblies or the requirement for specialist tooling to activate them, as described earlier herein. The further advantage offered by the present invention is thus a reduction in manufacturing time and complexity.

It will be appreciated that a range of modifications can be made to this embodiment without departing from the scope of the invention as defined in the appended claims. For example, the materials could be varied or an extendible lever could be based upon a different lever mechanism. Furthermore, it will be appreciated that the lever assembly may be mounted in any suitable orientation and location.

Aspects of the invention are described in the following clauses:

Clause 1. A lever, or a lever assembly comprising a lever, for actuating a release mechanism of a vehicle, the lever being arranged for translating input force applied to an input of the lever into output force exerted at an output of the lever, wherein the input comprises an input formation for engaging a lever extension for enhancing a mechanical advantage of the lever, and the output comprises an output formation co-operable with a release element of a release mechanism.

Clause 2. The lever or lever assembly of clause 1, wherein the input formation is arranged for locating and engaging an extension to form an extended input, such that input force can be applied to the extension and translated into output force exerted at the output of the lever.

Clause 3. The lever or lever assembly of clause 1, wherein the input formation is arranged to engage an extension in a sliding clearance fit.

Clause 4. The lever or lever assembly of clause 1, wherein the input formation comprises a slot.

Clause 5. The lever or lever assembly of clause 4 wherein the slot is arranged for engaging a shaft of a screwdriver constituting the extension.

Clause 6. The lever or lever assembly of clause 4, wherein the slot is arranged for engaging a shaft of a flat-tipped screwdriver constituting the extension.

Clause 7. The lever or lever assembly of clause 4 wherein the slot comprises a generally oblong cross-section.

Clause 8. The lever or lever assembly of clause 4 wherein the slot is tapered.

Clause 9. The lever or lever assembly of clause 4 wherein the slot comprises first and second openings.

Clause 10. The lever or lever assembly of clause 1 wherein the input formation comprises one or more reinforced walls.

Clause 11. The lever or lever assembly of clause 1 wherein the input comprises a finger grip.

Clause 12. The lever or lever assembly of clause 1 wherein the output formation comprises a fixing for securing a release element.

Clause 13. The lever or lever assembly of clause 12 wherein the fixing is a unidirectional fixing.

Clause 14. The lever or lever assembly of clause 1, wherein the lever is arranged to amplify the force translated from the input to the output such that a mechanical advantage of the lever is greater than 1:1.

Clause 15. The lever or lever assembly of clause 14, wherein the mechanical advantage of the un-extended lever is in the range of from 1:1 to 3:1.

Clause 16. The lever or lever assembly of clause 1, wherein the lever is a second order lever in which the output is located between a fulcrum and the input.

Clause 17. The lever or lever assembly of clause 1 wherein the lever comprises a pivotable member comprising the input and optionally the output.

Clause 18. The lever or lever assembly of clause 17, wherein the input formation is on a first side of the pivotable member and the pivotable member defines a release element path on an opposed, second side of the pivotable member.

Clause 19. The lever or lever assembly of clause 18 wherein the release element path is defined by a guide of the pivotable member.

Clause 20. The lever or lever assembly of clause 19 wherein the guide comprises a curved guide surface.

Clause 21. The lever or lever assembly of clause 17 wherein the pivotable member comprises a finger grip of the input.

Clause 22. The lever or lever assembly of clause 21 wherein the input formation is on a first side of the pivotable member and the pivotable member comprises a finger grip on an opposed, second side of the pivotable member.

Clause 23. The lever or lever assembly of clause 22 wherein the second side of the pivotable member comprises a resting surface for the pivotable member and the finger grip is configured to aid lifting of the pivotable member when resting on the resting surface.

Clause 24. The lever or lever assembly of clause 17 wherein the pivotable member comprises a first portion comprising the input formation and a second portion comprising the output formation, the first and second portions meeting at a kink of the pivotable member.

Clause 25. The lever or lever assembly of clause 24 wherein the first and second portions are integral.

Clause 26. The lever or lever assembly of clause 24 wherein the pivotable member comprises an outer side bearing the input formation and an opposed, inner side, the first and second portions meeting such that the pivotable member is kinked towards the inner side.

Clause 27. A lever assembly according to clause 17 comprising a base, wherein the pivotable member is pivotable relative to the base between a first and a second position.

Clause 28. The lever assembly of clause 27 wherein the base pivotably supports the pivotable member at a fulcrum.

Clause 29. The lever assembly of clause 28 wherein the fulcrum comprises a rivet pivotably connecting the pivotable member and the base.

Clause 30. The lever assembly of clause 27 wherein the base defines a recess for accommodating pivoting movement of the pivotable member.

Clause 31. The lever assembly of clause 27 wherein the pivoting member comprises a guide and the base defines a recess for accommodating pivoting movement of the guide.

Clause 32. The lever assembly of clause 27 wherein the pivotable member comprises a first portion comprising the input formation, and a second portion comprising the output formation, the first and second portions meeting at a kink of the pivotable member, and wherein the base supports the second portion of the pivotable member.

Clause 33. The lever assembly of clause 32 wherein the input formation is arranged to engage the extension in an engagement plane, the engagement plane being at an angle in the range of from 90 to 115 degrees to an end panel of the second portion of the pivotable member.

Clause 34. The lever assembly of clause 27 wherein the pivotable member is movable through an arc in the range of from 45 to 135 degrees.

Clause 35. The lever assembly of clause 27 wherein the base defines a release element path.

Clause 36. The lever assembly of clause 35 wherein the base and the pivotable member together define a combined a release element path, and wherein the pivotable member is movable with respect to the base between a first position in which the combined path is relatively short and a second position in which the combined path is relatively long.

Clause 37. The lever assembly of clause 36 wherein the combined path is arcuate, or comprises an arcuate section, in the second position.

Clause 38. The lever assembly of clause 36 wherein the combined path is substantially linear in the first position.

Clause 39. The lever assembly of clause 27 wherein the base comprises a locating formation for locating a release element in the release element path.

Clause 40. The lever assembly of clause 39 wherein the locating formation defines an aperture for locating a release element therein.

Clause 41. The lever assembly of clause 39 wherein the pivotable member is movable with respect to the base between a first position in which the output formation is relatively close to the locating formation and a second position in which the output formation is relatively distant from the locating formation.

Clause 42. The lever assembly of clause 27 wherein the base comprises a clip for engaging the pivotable member in the first position and/or the second position.

Clause 43. The lever assembly of clause 27 wherein the pivotable member is arranged to abut the base in the first position to delimit further movement in a direction away from the second position.

Clause 44. The lever assembly of clause 27 wherein the pivotable member is arranged to abut the base in the second position to delimit further movement in a direction away from the first position.

Clause 45. The lever assembly of clause 44 wherein the pivotable member comprises a stop formation for abutting the base in the second position.

Clause 46. The lever assembly of clause 27 wherein the base comprises formation for engaging a mounting bracket.

Clause 47. The lever or lever assembly of clause 1, wherein the (un-extended) lever has a maximum pivoting radius of less than 10 cm.

Clause 48. The lever or lever assembly of clause 1, wherein the release element comprises a cable.

Clause 49. The lever assembly of clause 48 wherein the base comprises a support formation for supporting an outer sheath of the cable.

Clause 50. The lever or lever assembly of clause 48 wherein the output formation comprises an aperture for engaging a nipple affixed to the cable.

Clause 51. A release system for a vehicle comprising: a release mechanism; and a lever, or lever assembly according to clause 1 co-operable with the release mechanism to actuate the release mechanism.

Clause 52. A park lock system comprising a park lock release mechanism and a lever, or lever assembly according to clause 1 co-operable with the park lock release mechanism.

Clause 53. The system of clause 51 wherein the release mechanism is co-operable with a pawl releasable from an engaged state by actuation, e.g. tensile actuation, of the release element.

Clause 54. A vehicle comprising a lever or lever assembly according to clause 1.

Clause 55. The vehicle of clause 54 wherein the lever, lever assembly or system is mounted under an engine bonnet of the vehicle.

Clause 56. A method of mounting a lever or lever assembly according to clause 1 in a vehicle or to a vehicle component, the method comprising passing the lever assembly through a gap with a maximum clearance of less than 10 cm.

Clause 57. A method of releasing a mechanism in a vehicle, the method comprising: providing a lever connected to a release element of the mechanism; extending the lever by engaging a rod-like extension with an input of the lever to provide an extended input; and actuating the release element by applying a force to the extended lever by actuating the extended input.

The invention claimed is:

1. A lever assembly comprising a lever, for actuating a transmission park lock release mechanism of a vehicle, the lever being arranged for translating input force applied to an input of the lever into output force exerted at an output of the lever, wherein the input comprises a finger grip, and a separate input formation for engaging a lever extension for enhancing a mechanical advantage of the lever, wherein the lever assembly is configured to enable finger access to the finger grip to enable finger actuation of the finger grip to move the lever at least from a first position associated with the transmission park lock being in a locked state, and wherein the output comprises an output formation configured to co-operate with a release element of the transmission park lock release mechanism.

2. The lever assembly of claim 1, wherein the input formation comprises a slot and wherein the slot is arranged for engaging a shaft of a screwdriver constituting the extension.

3. The lever assembly of claim 1, wherein the finger grip is arranged for causing movement of the lever in dependence on finger actuation applied to the finger grip.

4. The lever assembly of claim 1, wherein the output formation comprises a fixing for securing the release element wherein the fixing is a unidirectional fixing.

5. The lever assembly of claim 1, wherein the lever is arranged to amplify the force translated from the input to the output such that a mechanical advantage of the lever is greater than 1:1, wherein the mechanical advantage of the un-extended lever is in the range of from 1:1 to 3:1.

6. The lever assembly of claim 1, wherein the lever comprises a pivotable member, wherein the input formation is on a first side of the pivotable member and the pivotable member defines a release element path on an opposed, second side of the pivotable member, wherein the release element path is defined by a guide of the pivotable member, wherein the guide comprises a curved guide surface.

7. The lever assembly of claim 6, wherein the pivotable member comprises a first portion comprising the input formation and a second portion comprising the output formation, the first and second portions meeting at a kink of the pivotable member, wherein the first and second portions are integral and wherein the pivotable member comprises an outer side bearing the input formation and an opposed, inner side, the first and second portions meeting such that the pivotable member is kinked towards the inner side.

8. The lever assembly according to claim 6, comprising a base, wherein the pivotable member is pivotable relative to the base between the first position and a second position.

9. The lever assembly of claim 8, wherein the base pivotably supports the pivotable member at a fulcrum, wherein the fulcrum comprises a rivet pivotably connecting the pivotable member and the base, wherein the base defines a recess for accommodating pivoting movement of the pivotable member, and wherein the pivoting member comprises the guide and the base defines a recess for accommodating pivoting movement of the guide.

10. The lever assembly of claim 8, wherein the pivotable member comprises a first portion comprising the input formation and a second portion comprising the output formation, the first and second portions meeting at a kink of the pivotable member, and wherein the base supports the second portion of the pivotable member.

11. The lever assembly of claim 8 wherein the base and the pivotable member together define a combined release element path, and wherein the pivotable member is movable with respect to the base between the first position in which the combined path is relatively short and the second position in which the combined path is relatively long, wherein the combined path is arcuate, or comprises an arcuate section, in the second position, and wherein the combined path is substantially linear in the first position.

12. The lever assembly of claim 8, wherein the base comprises a locating formation for locating the release element in the release element path.

13. The lever assembly of claim 8, wherein the base comprises a clip for engaging the pivotable member in the first position and/or the second position.

14. The lever assembly of claim 8, wherein the pivotable member is arranged to abut the base in the first position to delimit further movement in a direction away from the second position, wherein the pivotable member is arranged to abut the base in the second position to delimit further movement in a direction away from the first position.

15. The lever assembly of claim 8, wherein the base comprises a formation for engaging a mounting bracket.

16. The lever assembly of claim 1, wherein the release element comprises a cable, wherein the base comprises a support formation for supporting an outer sheath of the cable, and wherein the output formation comprises an aperture for engaging a nipple affixed to the cable.

17. A release system for a vehicle comprising:
a transmission park lock release mechanism; and
a lever assembly according to claim 1, wherein the lever is co-operable with the transmission park lock release mechanism to actuate the transmission park lock release mechanism.

18. A vehicle comprising a lever assembly according to claim 1, wherein the lever is mounted to a powertrain assembly of the vehicle; and wherein the lever, a mounting bracket and a cable which the lever actuates are mounted solely to said powertrain assembly.

19. The lever assembly of claim 1, wherein the lever is arranged to amplify the force translated from the input to the output such that a mechanical advantage of the un-extended lever is greater than 1:1 for effort applied at the finger grip.

20. A method of releasing a transmission park lock release mechanism in a vehicle including a lever assembly comprising a lever connected to a release element of the transmission park lock release mechanism, and the lever comprising a finger grip, wherein the lever assembly is configured to enable finger access to the finger grip to enable finger actuation of the finger grip to move the lever at least from a first position associated with the transmission park lock being in a locked state, the method comprising:
extending the lever by engaging a rod-like extension with an input of the lever to provide an extended input; and
actuating the release element by applying a force to the extended lever by actuating the extended input.

* * * * *